(12) United States Patent
Henttonen et al.

(10) Patent No.: US 8,593,990 B1
(45) Date of Patent: Nov. 26, 2013

(54) MEASUREMENT REPORTING

(71) Applicant: Renesas Mobile Coporation, Tokyo (JP)

(72) Inventors: Tero Henttonen, Espoo (FI); Brian Alexander Martin, Farnham (GB); Keiichi Kubota, Weybridge (GB); Wei Bai, Beijing (CN); Samuli Turtinen, Ii (FI); Jari Isokangas, Tampere (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/863,936

(22) Filed: Apr. 16, 2013

Related U.S. Application Data (63) Continuation of application No. PCT/CN2012/079646, filed on Aug. 3, 2012.

(30) Foreign Application Priority Data

Sep. 12, 2012 (GB) .................................. 1216293.9

(51) Int. Cl.
   *G01R 31/08* (2006.01)
(52) U.S. Cl.
   USPC ............ 370/252; 455/436; 455/437; 370/331
(58) Field of Classification Search
   USPC ........ 455/73, 412.1, 433, 436, 437, 445, 453; 370/252, 276, 311, 331, 335
   See application file for complete search history.

(56) References Cited

U.S. PATENT DOCUMENTS

| | | | |
|---|---|---|---|
| 6,792,284 B1 * | 9/2004 | Dalsgaard et al. ............ | 455/525 |
| 7,313,116 B2 * | 12/2007 | Lee et al. ..................... | 370/335 |
| 7,369,853 B2 * | 5/2008 | Son et al. ..................... | 455/436 |
| 7,406,314 B2 * | 7/2008 | Sharma ......................... | 455/445 |
| 7,409,214 B2 * | 8/2008 | Lee .............................. | 455/436 |
| 7,792,537 B2 * | 9/2010 | Wilborn et al. ............... | 455/502 |
| 7,953,412 B2 * | 5/2011 | Lee et al. ...................... | 455/436 |
| 8,391,238 B2 * | 3/2013 | Rune et al. ................... | 370/331 |
| 2009/0005029 A1 * | 1/2009 | Wang et al. .................. | 455/423 |
| 2013/0188499 A1 * | 7/2013 | Mach et al. ................... | 370/252 |

OTHER PUBLICATIONS

Nokia, et al., "Requirements for Redirection in E-UTRAN", 3GPP TSG-RAN WG2 Meeting #59, R2-073346, R2-072390, & R2-071723, Athens, Greece, Aug. 24-27, 2007, XP-050026820 (4 pages).

UKIPO Combined Search and Examination Report under Section 17 and 18(3) dated October 5, 2012 which is issued in a related British Application No. GB1216293.9 (5 page).

* cited by examiner

*Primary Examiner* — Jinsong Hu
*Assistant Examiner* — Nathan Taylor
(74) *Attorney, Agent, or Firm* — Lucas & Mercanti LLP; Robert P. Michal

(57) ABSTRACT

A network sends downlink a neighbor frequency list for redirection (with at least one neighbor frequency) for measurement, for example event-triggered measurement. For each frequency in the list which a user equipment UE finds to satisfy one or more criteria, for example event-triggering criteria, the idle-state or semi-idle-state UE then takes a measurement of the neighbor frequency and checks whether the measurement satisfies reporting criteria. The UE sends to its serving cell an indication of the neighbor frequency or frequencies whose measurement meets the reporting criteria, without reporting the measurement, such as in a RRC Connection Request message. The serving cell then redirects the UE to establish a connection on a target frequency selected from the indicated neighbor frequencies, and this redirect may be in a RRC Connection Reject message.

17 Claims, 3 Drawing Sheets

MEASUREMENT REPORTING

CROSS REFERENCE TO RELATED APPLICATIONS

This application is a Continuation of PCT International Patent Application No. PCT/CN2012/079646 filed on Aug. 3, 2012, and claims the benefit under 35 U.S.C. §119(a) and 37 CFR 1.55 to UK Patent Application No. 1216293.9 filed on Sep. 12, 2012, the entire contents of each of which are incorporated herein by reference.

TECHNICAL FIELD

The present disclosure relates generally to wireless communication systems, methods, devices and computer programs and, more specifically, but not exclusively to measurement reporting of neighbor cells/frequencies and related signaling in a wireless radio system.

BACKGROUND

Congestion in cellular radio networks is a continuing concern as both the number of users and especially the volume of data being handled continues to increase. In a typical cell there will be a number of user equipments (UEs) in a connected state with the cell and a number of other UEs in an idle state. Only those in the connected state can send and receive user data, those in the idle state listen at prescribed times in case there is an incoming call to them, and they also measure and report on neighbor cells so they can be redirected or handed over efficiently as they move across the cell.

Different radio access technologies (RATs) use different terms for the idle and the connected states. For example, the Universal Terrestrial Radio Access (UTRA) has several different states beyond the actual IDLE state which may be considered as idle or at least semi-idle, including the cell forward access channel (CELL-FACH) state (semi-idle), the cell paging channel state (CELL-PCH) state (semi-idle) and the UTRA registration area paging channel state (URA-PCH). The common feature of these UTRA states is that the UE is not allocated a dedicated channel (DCH) for user traffic. The Evolved Universal Terrestrial Radio Access (E-UTRA) system, sometimes referred to as long term evolution (LTE), terms the UE as being in either an idle mode or a radio resource control (RRC) connected mode. Unless otherwise indicated herein, the terms idle (or semi-idle) state and connected state are used in a generic fashion and not specific to any RAT. When a UE is camped on a cell this also indicates it is in an idle or semi-idle state.

When a UE in an idle/semi-idle state attempts to establish a connection with a radio network cell such as to place a call or access email or some social network, the radio network currently has no means by which to re-direct the UE to instead connect to an alternate frequency. Current radio network procedures require the UE's connection request to be either rejected outright or accepted. Network operators prefer not to reject connection requests (a RRC Connection Reject message in E-UTRAN), but if the cell is congested that leaves the network only the option of allowing the UE's requested connection and handing it over soon after to another frequency. If congestion is too severe this may not be possible, but if it is the process of accepting the UE's connection request increases cell congestion on the original congested frequency until the redirection can take place. What is needed is a more effective procedure for radio networks to carry out load balancing with new connection requests.

One technique to handle such overloads was proposed for the Universal Mobile Telecommunication System (UMTS, also UTRA) in document R2-105129 which is a change request for 3GPP TS 25.331 (3GPP TSG RAN WG2 Meeting #71; Madrid, Spain; 23-27 Aug. 2010). In this approach the UE sends capability flags in its RRC Connection Request message to indicate which frequency bands the requesting UE supports so the network knows the UE's capability. Knowing the UE capability is not enough, because the network needs to know whether the UE sees this neighbor frequency with sufficient strength and/or quality to connect otherwise the UE might not be able to establish the connection. While the Measurement Report message for inter-RAT LTE measured results can be reported by a UE in the CELL-FACH state, it is not clear how these results can be signalled in the LTE idle mode or in the UTRA CELL-PCH/URA-PCH states, so at best this appears a partial solution only.

For the E-UTRA system, the inventors are aware of two relevant proposals. Document R2-122553 entitled Network Controlled CELL_FACH Mobility (3GPP TSG-RAN WG2 Meeting #77bis; Prague, Czech Republic; 21-25 May 2012) includes E-UTRA measured results in an uplink RRC message so that the radio network can redirect the UE to the measured E-UTRA frequency. Document R2-122609 notes disadvantages with a prior de-prioritisation request signalled to the UE via a RRC Connection Reject message and proposes instead to signal re-direction information via the RRC Connection Reject message. Some reservations have been expressed in that the network will not at that time know the UE's capabilities and so the re-direction might send the UE to a neighbor frequency it does not support. This does not appear solvable by including the UE's measured results of the frequencies of RATs in the UE's RRC Connection Request message, since there appears insufficient space in this uplink control channel message to do so. The similar constraint is seen to prevent the UE reporting such results in its Cell Update message while in the CELL-PCH or URA-PCH state.

SUMMARY

In a first embodiment, there is a method for controlling a network access node in a wireless communication system, the method including:

sending downlink a neighbor frequency list for redirection for measurement, the list including at least one neighbor frequency; and in response to receiving from a user equipment during transition from an idle or semi-idle state an indication that its measurement of at least one of the neighbor frequencies in the list meets one or more reporting criteria, redirecting the user equipment to establish a connection on a target frequency selected from the at least one of the neighbor frequencies.

In a second embodiment, there is apparatus for controlling a network access node in a wireless communication system, the apparatus including at least one processor and at least one memory including computer program code, the at least one memory and the computer program code being configured to, with the at least one processor, cause the apparatus at least to:

send downlink a neighbor frequency list for redirection for measurement, the list including at least one neighbor frequency; and in response to receiving from a user equipment during transition from an idle or semi-idle state an indication that its measurement of at least one of the neighbor frequencies in the list meets one or more reporting criteria, redirect the user equipment to establish a connection on a target frequency selected from the at least one of the neighbor frequencies, in a third embodiment, there is a computer program product including a non-transitory computer-readable storage medium having computer readable instructions stored thereon, the computer readable instructions being executable by a computerized device to cause the computerized device to control a network access node in a wireless communication system to at least:

send downlink a neighbor frequency list for redirection for measurement, the list including at least one neighbor frequency; and in response to receiving from a user equipment during transition from an idle or semi-idle state an indication that its measurement of at least one of the neighbor frequencies in the list meets one or more reporting criteria, redirect the user equipment to establish a connection on a target frequency selected from the at least one of the neighbor frequencies.

In a fourth embodiment, there is a method for controlling a user equipment in a wireless communication system, the method including:

fix each neighbor frequency in a received neighbor frequency list for redirection whose received signal strength and/or quality meet one or more criteria, taking a measurement of the neighbor frequency while the user equipment is in transition from an idle or semi-idle state;

checking whether the measurement satisfies reporting criteria; and sending to a serving network access node an indication of the neighbor frequency or frequencies whose measurement meets the reporting criteria, without reporting the measurement.

In a fifth embodiment, there is apparatus for controlling a user equipment in a wireless communication system, the apparatus including at least one processor and at least one memory including computer program code, the at least one memory and the computer program code being configured to, with the at least one processor, cause the apparatus at least to:

for each neighbor frequency in a received neighbor frequency list for redirection whose received signal strength and/or quality meet one or more criteria, take a measurement of the neighbor frequency while the user equipment is in transition from an idle or semi-idle state;

check whether the measurement satisfies reporting criteria; and send to a serving network access node an indication of the neighbor frequency or frequencies whose measurement meets the reporting criteria, without reporting the measurement.

In a sixth embodiment, there is a computer program product including a non-transitory computer-readable storage medium having computer readable instructions stored thereon, the computer readable instructions being executable by a computerized device to cause the computerized device to control a user equipment in a wireless communication system to at least:

for each neighbor frequency in a received neighbor frequency list for redirection whose received signal strength and/or quality meet one or more criteria, take a measurement of the neighbor frequency while the user equipment is in transition from an idle or semi-idle state;

check whether the measurement satisfies reporting criteria; and send to a serving network access node an indication of the neighbor frequency or frequencies whose measurement meets the reporting criteria, without reporting the measurement.

Further features and advantages will become apparent from the following description of preferred embodiments, given by way of example only, which is made with reference to the accompanying drawings.

DETAILED DESCRIPTION

Figure 1:
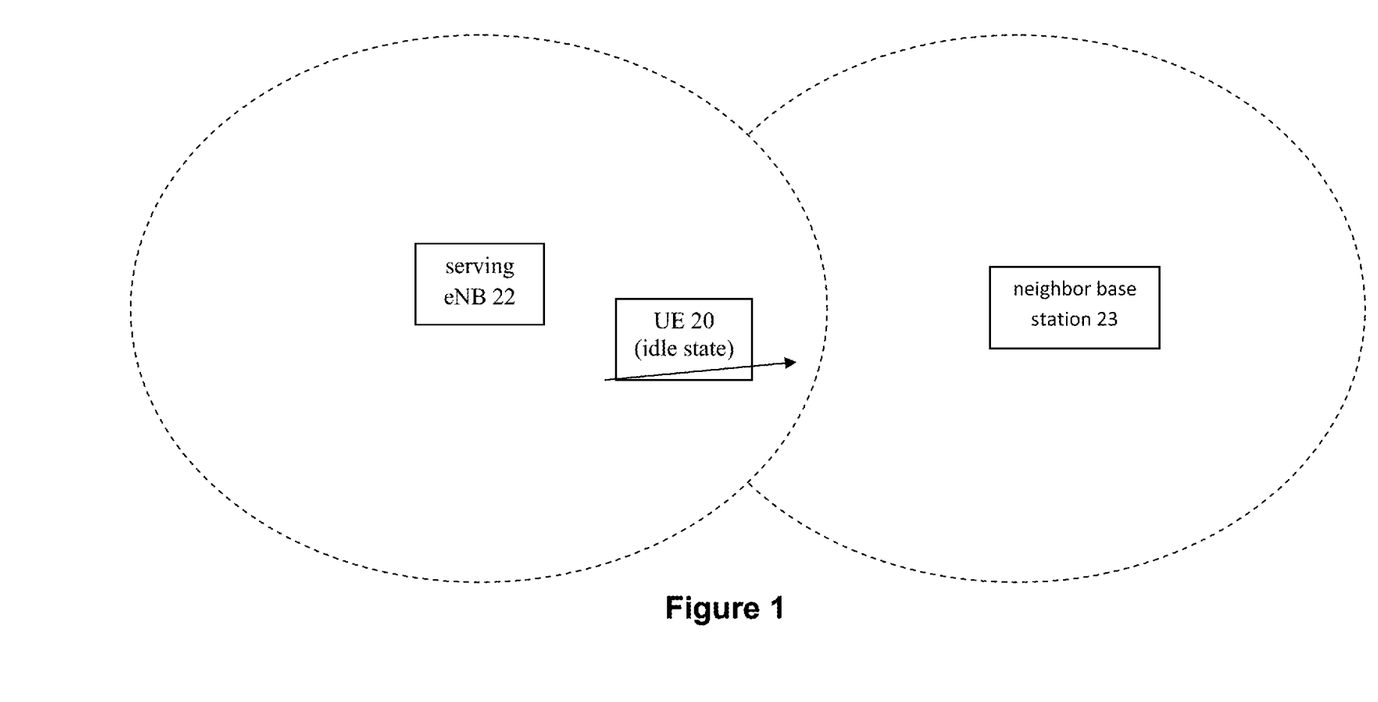
FIG. 1 is a schematic diagram of a UE proximal to two cells which is an example radio environment in which these teachings can be employed.

FIG. 1 is a schematic diagram of a UE with two cells which is an example radio environment in which these teachings can be employed. Assume the UE 20 is in an idle or semi-idle state while traversing through the cell controlled by the serving eNB 22 and listens periodically for pages by that serving eNB 22 on a first frequency. The UE 20 is moving in the direction of the arrow toward the neighbor base station 23 which is operating on a different layer than what the UE 20 is camped on with the serving cell. That different layer may be a neighbor frequency in the same RAT as the serving eNB 22, or it may be in as different RAT from the serving eNB 22. The first frequency has become congested and the idle/semi-idle-state UE 20 sends to the serving eNB 22 a RRC Connection Request message in order to establish a connection to make a call. The serving eNB 22 prefers not to congest its first frequency further and would rather the UE 20 established that RRC connection with the neighbor cell 23 on the neighbor frequency.

FIG. 1 is a straightforward deployment so the reader may more clearly understand the teachings herein. In other relevant radio scenarios the neighbor frequency may also be operated by the serving eNB 22, and/or the neighbor base station 23 may be operating on a different RAT from that used between the serving eNB 22 and the UE 20. The neighbor base station 23 may also be embodied as a remote radio head operated by the serving eNB 22. So as not to foreclose these other possibilities the description below teaches in terms of the first and neighbor frequencies, the first frequency being that on which the UE 20 is camped and the neighbor frequency being one on which the UE 20 is not. For context, the serving eNB 22 has congestion on the first frequency and prefers the UE 20 to establish its connection on the second/neighbor frequency. The second/neighbor frequency can be intra-RAT in which case it is utilized with the same RAT as the first frequency, or it may be inter-RAT in which case it is utilized with a different RAT.

In embodiments, the solution herein to the problem set forth in the background section involves the UE 20 making an event-triggered measurement of a neighbor frequency. It is known for a UE in the RRC connected state to take periodic measurements of neighbor cells provided to the UE in a neighbor cell list. Those periodic measurements are not event driven as is the case of some embodiments herein. In this case the event is that the UE 20 in transition from the idle or semi-idle state sees the received signal strength and/or quality of the neighbor frequency exceeding a threshold. The UE 20 is configured for one or more frequencies for this event triggered measurement by the network, and in a specific but non-limiting embodiment the UE may use for the event-driven and redirection oriented measurements the same neighbor frequency list as the network might provide the UE for periodic neighbor cell measurements. To maintain a distinction for other embodiments, the list used for the event driven measurements is termed herein as a neighbor frequency list for redirection. In one embodiment the network lists the relevant one or more neighbor frequencies in its broadcast system information. In another embodiment the network configures the UE 20 for the relevant neighbor frequency or frequencies via a downlink RRC message (point to point).

For whichever of those neighbor frequencies of the neighbor frequency list for redirection on which the UE is capable of operating, the UE 20 will then check whether the received signal strength and/or the quality of that neighbor frequency exceeds a threshold. More particularly, there are event criteria which the UE checks are met, for example the received signal strength and/or the quality exceeding a threshold for some minimum time interval. If the event criteria are met for a given frequency the UE 20 will then, during transition from an idle or semi-idle state, take a measurement of that neighbor frequency. There are various measurements the UE 20 can take in this case, for example reference signal received power RSRP, reference signal received quality RSRQ, and others known in the art for measuring neighbor frequencies. The UE 20 compares its neighbor frequency measurement against the measurement reporting criteria and reports the results as a flag in an uplink RRC message. The reporting criteria may be a threshold RSRP or RSRQ and some minimum time interval over which the measured results exceed the threshold. That minimum time interval is conveniently termed herein as a time to trigger (TTT), and both the threshold and the TTT interval are known to the UEs. In an embodiment the reporting criteria are the same used by the RRC Connected UEs to report their neighbor cell measurements. But in these teachings the flag does not report the measured results quantitatively, only the comparison of the measured results against the reporting criteria. Being a flag it will require as little as only one bit per frequency. For example setting the flag bit to "1" indicates the measurement met the reporting criteria from which the serving eNB 22 can recognize that that neighbor frequency is as suitable target to re-direct the UE 20 for establishing its RRC connection. In one particular but non-limiting embodiment the UE 20 reports a bit for each of the frequencies in the neighbor frequency list for redirection, so the UE 20 will set that flag bit to zero for a) the corresponding neighbor frequency for which it is not compatible, or b) the corresponding neighbor frequency for which its measurement did not meet the reporting criteria. From the bit=zero flags the serving eNB 22 can recognize which neighbor frequency or frequencies is/are not a suitable target for redirecting the UE 20 to establish its RRC connection.

In one embodiment the event threshold (or all of the event criteria) is signaled to the UE 20 in the system information or in the downlink RRC message with the neighbor frequency list for redirection. In another embodiment the event threshold or all the event criteria is hard coded, established in a published radio standard and thus it is not necessary to signal as both UE 20 and serving eNB 22 know it in advance.

Figure 2:
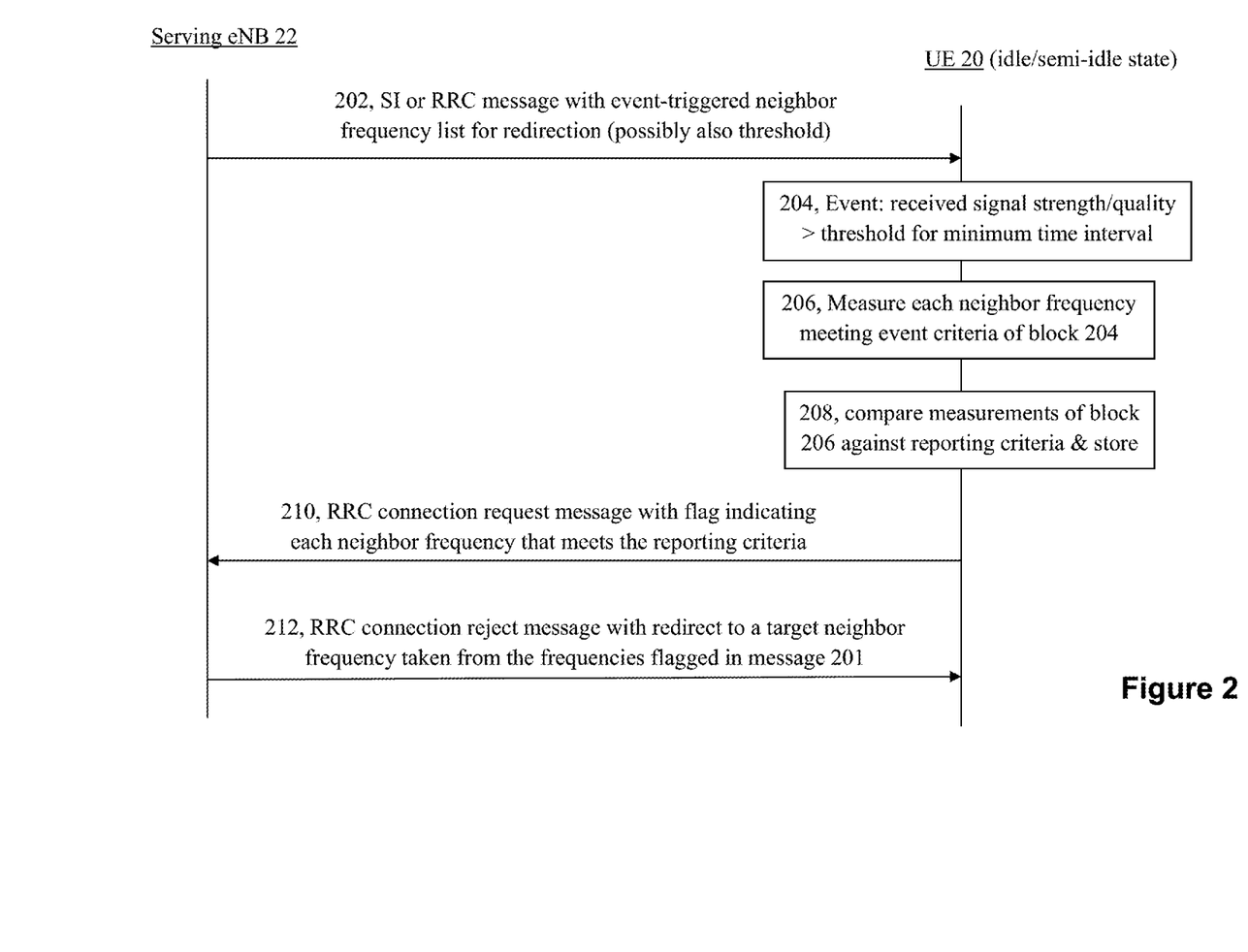
FIG. 2 is a logic flow diagram illustrating from the perspective of the UE the operation of a method, and a result of execution of computer program instructions embodied on a computer readable memory, for practicing embodiments of these teachings.

The overall process is first explained with respect to the signaling diagram of FIG. 2, and after which will be expanded details for example implementations in UTRA and E-UTRA networks. The UE 20 first receives from the network at message 202 in system information (SI) or via an RRC message a neighbor frequency list for redirection. This neighbor frequency list for redirection may have only one neighbor frequency or more than one, and one or more may be inter-RAT or intra-RAT frequencies. As noted above the criteria (or at least the threshold), in these embodiments event criteria, may also be in this downlink message 202.

While FIG. 2 shows the UE 20 in the idle or semi-idle state when it receives this downlink message 202, that is not necessary; the UE 20 may begin in a RRC connected state with the serving cell 22 when it listens to the SI or receives the downlink RRC message, and after completing the ongoing call go into the idle or semi-idle state. Where the neighbor frequency list for redirection is given in a downlink RRC message, in one embodiment this message is sent soon after the UE 20 becomes established with the serving cell.

Having received the downlink signaling 202, the UE 20 will, during transition from an idle or semi-idle state, measure signal strength and/or quality of the neighbor frequencies in the list and check at block 204 if any meet the event criteria. If any do meet the event criteria, the measurement event for that neighbor frequency is triggered and at block 206 the UE 20 makes the more extensive measurement of the relevant neighbor frequency or frequencies. The UE 20 then checks at block 208 whether this more extensive measurement of the neighbor frequency meets the measurement reporting criteria, and stores this information in its local memory.

At some time unrelated to the measuring and comparing of blocks 206 and 208, the UE 20 needs to establish an RRC connection. This may be UE-initiated, or it may be in response to receiving a page that the UE 20 has an incoming call. Immediately the UE 20 consults the comparison from block 208 that it stored in its memory to see which neighbor frequencies meet the reporting criteria.

Now having a need to establish an RRC connection, the UE 20 then signals at message 210 an uplink RRC message which neighbor frequency/frequencies of the neighbor frequency list for redirection meet the reporting criteria. In one embodiment it is convenient to signal this using frequency-specific flags in the UE's RRC Connection Request message, one flag for each neighbor frequency. The conventional RRC Connection Request does not have room for full measurement results but these few frequency-specific bits can be added without impacting other signaling protocols.

In the assumed radio environment the first frequency on which the UE 20 is camped is congested and so the serving eNB 22 prefers to offload this newly requested RRC connection to a neighbor frequency, which that same eNB 22 might be operating or which might be handled by some neighbor base station 23. The serving eNB 22 will know the congestion status of other neighbor cells' frequencies via its X2 interface with them (or via other control interfaces for inter-RAT cells, or via an operations and maintenance O&M entity). So from among the neighbor frequencies of the neighbor frequency list for redirection which the UE 20 indicated at uplink message 210 meet the measurement reporting criteria, the serving eNB 22 will choose one and signal that target frequency to the UE 20 at message 212. It is convenient that this redirect indication be included in the serving eNB's RRC Connection Reject message to the UE 20.

As with the flags in the uplink RRC message 210, the target cell indication in the downlink RRC message 212 can be as small as a few bits. For example, it may be signaled as an index to either the whole neighbor frequency list for redirection that was sent downlink in message 202, or an index to the frequencies corresponding to the flags reported by the UE 20 in uplink message 210 if the implementation does not have the UE reporting a flag for each listed frequency (for example, if the UE 20 only sends a flag for those frequencies for which it is compatible or which meet the reporting criteria).

In another embodiment, the UE reports that the measurement reporting criteria have been met in a new information element added to either the RRC Connection Request message or in a new uplink RRC message. This option is detailed further below, but still it is not the full measurement results which the UE 20 reports but only whether the neighbor frequency measurement reporting criteria have been met.

Now are detailed some non-limiting implementations for different RAT-specific scenarios.

E-UTRAN Frequency Redirection in E-UTRAN.

In this scenario the UE 20 is in the idle state in the E-UTRA system and the serving eNB 22 will re-direct the UE 20 to an intra-RAT neighbor frequency. In an example implementation for this scenario, the serving eNB adds a new measurement configuration in system information block (SIB) 3 or SIB5. This is a more particular implementation of the SI downlink message 202 of FIG. 2. In another embodiment there is also added a new information element (IE) "E-UTRA frequency information for redirection" in which this new information element is carried in either or both of those SIBs. However implemented, this is the neighbor frequency list for redirection which gives the frequencies that the UE tests against the event criteria (block 204 of FIG. 2). This implementation may include signaling the event criteria also in SIB3 and/or SIB5, or as above the event criteria may be hard coded and implied by a 1 bit indication which tells the UE 20 whether or not the event-triggered measurement reporting is configured or not in the cell. If not signaled or implied by the one bit indication, in another embodiment the event criteria is implied by the neighbor frequency list for redirection that measurement of those frequencies according to these teachings is enabled. In another embodiment, whether or not the hard-coded event-triggered measurement is configured or not in the cell may be indicated by one bit per frequency in the neighbor cell list or in the neighbor frequency list for redirection (for example, each bit indicates whether event-triggered measurement for the corresponding frequency is configured or not), or a separate IE.

Signaling from the UE is changed in this implementation for example by adding a single bit to indicate that the measurement reporting criteria have been met for at least one of the signaled frequencies. Alternative to this one-bit flag reporting the results of the measurement against the reporting criteria, the UE 20 can signs a new IE to send the similar information in the RRC Connection Request message 210 for each E-UTRA frequency signaled in SIB5. Or instead if a new IE "E-UTRA frequency information for redirection" is added in SIB3 or SIB5, there will in an embodiment be one new IE per E-UTRA frequency in the IE "E-UTRA frequency information for redirection".

In this implementation, the network signals event A4 measurement configuration in SIB3 or SIB5, and optionally signals an E-UTRA frequency information IE, which is measured with the event 4A configuration. Event A4 means when the neighbor frequency becomes better than a threshold and the UE 20 checks this at block 204 of FIG. 2. The UE then measures the E-UTRA frequencies which were signaled in the SI while the UE is still in the idle mode, which is block 208 of FIG. 2.

When the UE 20 initiates RRC connection establishment, it indicates a corresponding new IE in the RRC Connection Request message 210 if the event A4 reporting criteria are met for one of the E-UTRA frequencies signalled in the SI.

If the UE indicates the new IE in the uplink RRC message, the network may trigger a redirection procedure toward the E-UTRAN frequency corresponding to the new IE in the uplink RRC message.

Inter-RAT Frequency Redirection in E-UTRAN.

In this scenario the UE 20 is in the idle state in the E-UTRA system and the serving eNB 22 will re-direct the UE 20 to an inter-RAT neighbor frequency. In this non-limiting implementation there is added to conventional signaling a new measurement configuration for the inter-RAT redirection (and optionally also there is added a new IE "inter RAT information for redirection", where the UE 20 measures and reports the measured results on the RAT) in SIB3, SIB6 for UMTS or SIB7 for GERAN. This may include signaling event criteria, but as above the event criteria may be hard coded and implied by a 1 bit indication or some other indication such as a list of frequencies that the measurement is enabled for a frequency (or frequencies). This may be 1 bit per frequency in the neighbor cell list or in the neighbor frequency list, or a separate IE.

In this implementation, there is also added a new IE in the RRC Connection Request message for each inter-RAT frequency signaled in SIB6 or SIB7. Or if a new IE "inter-RAT information for redirection" is added in SIB3, SIB6 or SIB7, there can be one such new IE per neighbor frequency. Alternatively a single bit can be used to indicate that the measurement reporting criteria have been met for at least one of the signaled frequencies.

In this scenario, the network signals event B1 measurement configuration in SIB3, SIB6 or SIB7, and optionally also signals an inter-RAT information element, which is measured with the event B1 configuration. Event B1 is met when the inter-RAT neighbor becomes better than a threshold for the prescribed time interval. The UE 20 then measures the inter-RAT frequencies signaled in the SI while the UE 20 is in the idle mode.

When the UE 20 initiates RRC connection establishment, it indicates a corresponding new IE in the RRC Connection Request message if the event B1 reporting criteria are met for one of the inter-RAT frequencies signaled in the SI. If the UE 20 indicates the new IE in the uplink RRC message, then the network may trigger a redirection procedure toward the inter-RAT frequency corresponding to the new IE in the uplink RRC message.

E-UTRAN Frequency Redirection in UMTS.

In this scenario, the UE 20 is in the idle or semi-idle state in the UTRA (UMTS) system and the serving cell (NodeB) 22 will re-direct the UE 20 to an inter-RAT neighbor frequency in the E-UTRAN system. For this non-limiting implementation, there is added to conventional signaling a new measurement configuration for the redirection (and optionally there is also added a new IE "E-UTRA frequency information for redirection", where the UE 20 measures and reports the measured results on the neighbor frequency) in SIB11, SIB11bis, SIB12 or SIB19. This may include signaling the event criteria, but as with the other non-limiting embodiments the event criteria may be hard coded and implied by a one-bit indication whether it is configured or not in the cell, or by some other indication such as signaling the neighbor frequency list for redirection, that the event-triggered measurement is enabled for a frequency (or frequencies). This may be one bit per frequency in the neighbor cell list or in the neighbor frequency list, or a separate IE.

On the UE side, there is added to conventional signaling a new IE in the RRC Connection Request for each E-UTRA neighbor frequency signaled in SIB9. This new IE may also be added to the Cell Update message but those messages are only used currently when the UE is in the RRC Connected mode. Or if a new IE "E-UTRA frequency information for redirection" is added in SIB11, SIB11bis, SIB12 or SIB19, there is added one new IE per each E-UTRA neighbor frequency in the IE "E-UTRA frequency information for redirection". Alternatively a single bit can be used to indicate that the measurement event criteria have been met for at least one of the signaled frequencies. In one non-limiting embodiment, this is realized by extending the existing "pre-redirection information" IE to indicate a bit that the necessary neighbor frequencies have met the measurement criteria.

In this scenario, the network signals the event 3c measurement configuration in SIB11, SIB11bis, SIB12 or SIB19, and optionally signals the E-UTRA frequency information, which is measured with the event 3c configuration. Event 3c is satisfied when the estimated quality of another system is above a certain threshold. The UE 20 then measures the E-UTRA neighbor frequencies signaled in the SI.

When the UE 20 initiates RRC connection establishment, it indicates a corresponding new IE in the RRC Connection Request message if the event 3c reporting criteria are met for one of the frequencies in the neighbor frequency list for redirection that is signalled in the SI.

When the UE 20 initiates a cell update procedure, it indicates a corresponding new IE in the Cell Update message if the event 3c reporting criteria are met for one of the E-UTRA neighbor frequencies signaled in the SI. As noted above, the Cell Update message is sent by the UE 20 in the RRC Connected mode.

If the UE 20 indicates the new IE in the uplink RRC message, then the network may trigger a redirection procedure toward the inter-RAT frequency corresponding to the new IE in the uplink RRC message.

Certain embodiments of these teachings provide a technical effect of improving the probability of a successful redirection since the good quality of the target frequency is guaranteed by the UE measurement, and the network will not trigger a redirection toward some neighbor frequency that is not supported by the UE. Additionally, the limited space in the uplink control channel message is not wasted by unnecessary information.

The elements shown at FIG. 2 for the serving eNB 22 and for the UE 20 may be considered as representing a logic flow diagram for those respective devices, and further may be considered to represent the operation of a method, and a result of execution of a computer program stored in a computer readable memory, and a specific manner in which components of an electronic device such as a UE or network access node (or one or more components thereof) are configured to cause that electronic device to operate. The various different steps shown in FIG. 2 may also be considered as a plurality of coupled logic circuit elements constructed to carry out the associated function(s), or specific result of strings of computer program code stored in a memory. As was noted, FIG. 2 provides more detailed implementation steps than the general principles set forth by these teachings.

The steps of FIG. 2 and the functions they represent are non-limiting examples, and may be practiced in various components such as integrated circuit chips and modules, and that embodiments may be realized in an apparatus that is embodied as an integrated circuit. The integrated circuit, or circuits, may include circuitry (as well as possibly firmware) for embodying at least one or more of a data processor or data processors, a digital signal processor or processors, baseband circuitry and radio frequency circuitry that are configurable so as to operate in accordance with embodiments.

Figure 3:
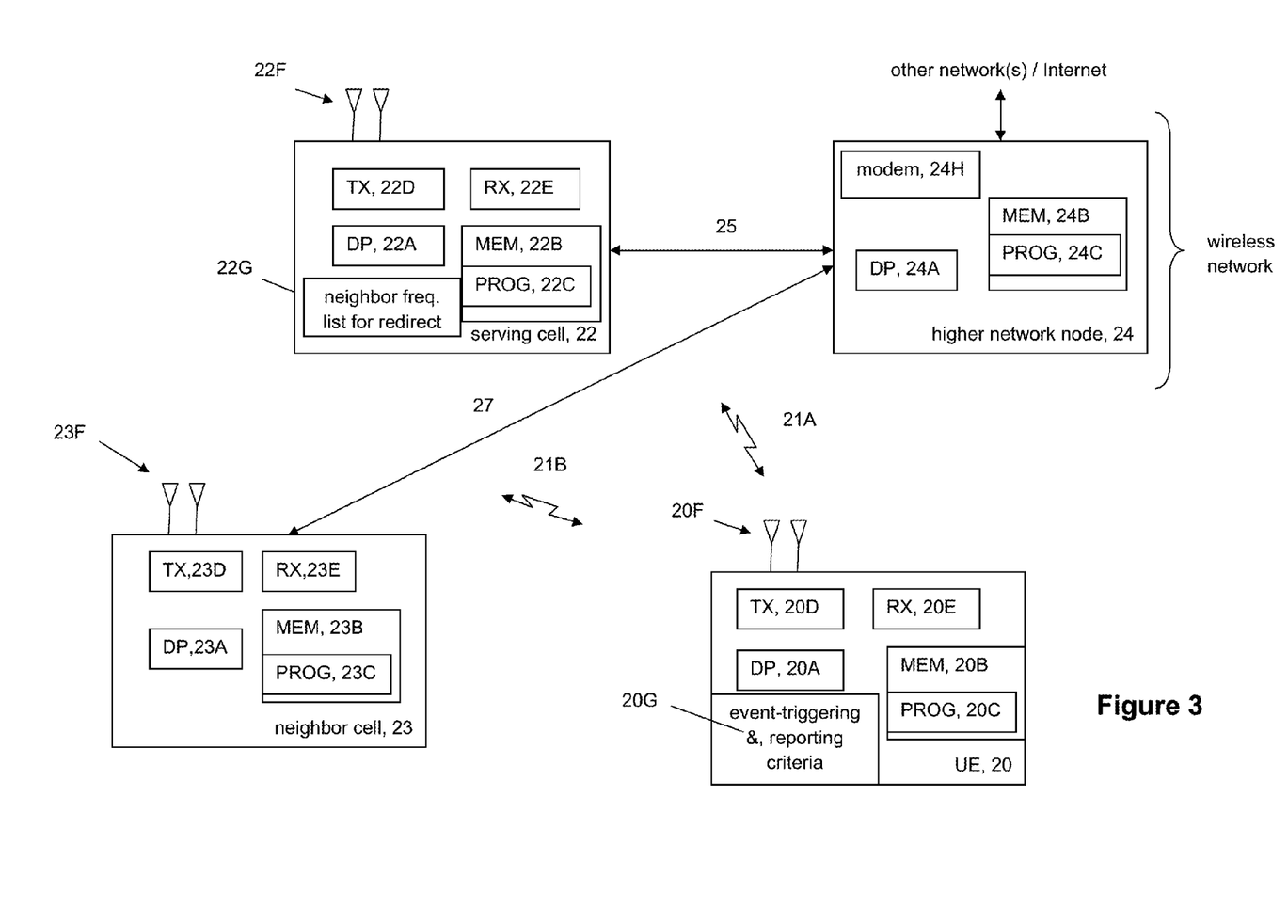
FIG. 3 is a simplified block diagram of a user equipment in communications with two access nodes of a cellular network, which are example electronic devices suitable for use in practicing embodiments of these teachings.

Reference is now made to FIG. 3 for illustrating a simplified block diagram of various electronic devices and apparatus that are suitable for use in practicing embodiments. In FIG. 3 there is a serving cell/serving network access node 22 such as a base transceiver station (termed a node B in the UTRAN system and an eNodeB in the E-UTRAN system) which is adapted for communication over a wireless link 21A with an apparatus 20 such as a mobile terminal or UE 20 in the idle state (or in one of the PCH/semi-idle states for UTRAN system case). The idle/semi-idle-state UE 20 may also be listening to and/or measuring other cells and so FIG. 3 illustrates the serving cell 22 and also illustrates another network access node, such as for example a neighbor cell 23, that has a wireless link 21B with the UE 20 over which the UE 20 takes measurements as detailed above. The serving cell 22 and the neighbor cell 23 may each be further communicatively coupled via respective data and control links 25, 27 to a higher network node 24 such as a radio network controller RNC in the case of the UTRAN system or a mobility management entity/serving gateway MME/S-GW 24 in the case of the E-UTRAN system. There may be a direct interface between the serving cell 22 and the neighbor cell 23, or if they are in different RATs they may be connected only via a control link between their respective but different high network nodes.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the serving cell 22 and at least for receiving signals from the neighbor cell 23 via one or more antennas 20F. Within the memory 20B of the UE 20 but shown separately as reference number 20G is also a computer program for comparing the neighbor cell's signal strength and/or quality against the threshold and for checking the measured results against the reporting criteria, as is detailed above in various embodiments.

The serving cell 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices 20 via one or more antennas 22F and a modem. The serving cell 22 also has stored in its memory at 22G software to compile the neighbor frequency list for the redirection and to check the flags or IEs that the UE 20 reports in its uplink RRC message such as the RRC Connection Request message, as is detailed by example above. In the E-UTRAN case, the serving eNB 22 compiles this list, in the UTRAN case the serving NodeB 22 gets the list from the higher network node 24 which is a Radio Network Controller RNC.

The neighbor cell/neighbor network access node 23 is similarly functional with blocks 23A, 23B, 23C, 23D, 23E and 23F, which are similar in function to those blocks having a same suffix and described for the serving cell/serving network access node 22.

For completeness, the higher network node 24 is also shown to include a DP 24A, and a MEM 24B storing a PROG 24C, and additionally a modem 24H for communicating with at least the serving cell 22. In the UTRA system, the higher node (RNC) 24 may be the entity which compiles the neighbor frequency list for redirection and then provides that list to the serving NodeB 22 for storage in its local memory 22B/22G and distribution to the UE 20. While not particularly illustrated for the UE 20 or cells 22, 23, those devices are also assumed to include as part of their wireless communicating means a modem which may in one example but non limiting embodiment be inbuilt on an RF front end chip so as to carry the respective TX 20D/22D/23D and RX 20E/22E/23E.

At least one of the PROGs 20C, 22C in the UE 20 and in the serving cell 22 (and at least for the UTRA case also in the higher network node/RNC 24) is assumed to include program instructions that, when executed by the associated DP 20A, 22A, 24A enable the device to operate in accordance with embodiments as detailed more fully above. In this regard embodiments may be implemented at least in part by computer software stored on the MEM 20B, 22B, 24B which is executable by the DP 20A, 22A, 24A of the respective devices 20, 22, 24; or by hardware; or by a combination of tangibly stored software and hardware (and tangibly stored firmware). Electronic devices implementing these aspects of embodiments need not be the entire UE 20, or serving cell 22, but embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 20 can include, but are not limited to: cellular terminals/telephones including smartphones; data cards, USB dongles, laptop computers, personal portable digital devices having wireless communication capabilities including but not limited to laptop/palmtop/tablet computers, digital cameras and music devices, and Internet appliances.

Various embodiments of the computer readable MEM 20B, 22B, 23B, 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A, 22A, 23A, 24A include but are not limited to general purpose computers, special purpose computers, microprocessors, digital signal processors (DSPs) and multi-core processors.

Various modifications and adaptations to the foregoing embodiments may become apparent to those skilled in the relevant arts in view of the foregoing description. While embodiments have been described above in the context of the E-UTRAN and the UTRAN systems, it should be appreciated that embodiments are not limited for use with only these types of wireless communication system, and that they may be employed in other wireless communication systems such as for example the GSM or GERAN or wideband code division multiple access (WCDMA) version of UTRAN, as some non-limiting further examples.

Some embodiments are described above in relation to event-triggered measurement, but embodiments may also be applied to non-event-triggered measurement. Embodiments include a method for controlling a network access node in a wireless communication system, the method including sending downlink a neighbor frequency list for redirection for measurement, the list including at least one neighbor frequency, and in response to receiving from a user equipment during transition from an idle or semi-idle state an indication that its measurement of at least one of the neighbor frequencies in the list meets one or more reporting criteria, redirecting the user equipment to establish a connection on a target frequency selected from the at least one of the neighbor frequencies. Embodiments include a method for controlling a user equipment in a wireless communication system, the method including for each neighbor frequency in a received neighbor frequency list for redirection whose received signal strength and/or quality meet one or more criteria, taking a measurement of the neighbor frequency while the user equipment is in transition from an idle or semi-idle state, checking whether the measurement satisfies reporting criteria, and sending to a serving network access node an indication of the neighbor frequency or frequencies whose measurement meets the reporting criteria, without reporting the measurement. In such embodiments, the method may include sending downlink at least one of at least a threshold of one or more criteria for including the measurement, a time interval for including the measurement, and an indication that the measurement is configured. In such embodiments, at least one of a threshold of the one or more criteria, a time interval of the one or more criteria, and an indication that the measurement is configured, is received in downlink signaling with the neighbor frequency list for redirection. In such embodiments, the neighbor frequency list for redirection for measurement may for example include a neighbor frequency list for redirection for event-triggered measurement and the method may for example include sending downlink at least one of at least a threshold of one or more event criteria for triggering the event-triggered measurement, a time interval for triggering the event-triggered measurement, and an indication that the event-triggered measurement is configured.

In embodiments, the phrases "during transition" or "in transition" could for example relate to transmission of a RRC connection request on transition from an idle to a connected (CELL_FACH) state. In embodiments, the phrases "during transition" or "in transition" could for example relate to transmission of a cell update on transition from a "CELL_PCH" state to a "CELL_FACH" state.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for controlling a network access node in a wireless communication system, the method comprising:
   sending downlink a neighbor frequency list for redirection for measurement, the list comprising at least one neighbor frequency; and
   in response to receiving from a user equipment during transition from an idle or semi-idle state an indication that its measurement of at least one of the neighbor frequencies in the list meets one or more reporting criteria, redirecting the user equipment to establish a connection on a target frequency selected from the at least one of the neighbor frequencies,
   wherein the indication comprises a one-bit flag for each of the neighbor frequencies in the list for which the user equipment is compatible, and each one-bit flag indicates whether the user equipment's measurement of the corresponding neighbor frequency meets the one or reporting criteria, and
   the indication is contained in an information element which is received in a received radio resource control message, or the indication is received in a RRC Connection Request message, and the redirecting comprises sending an indication of the target frequency in a RRC Connection Reject message.

2. The method according to claim 1, wherein the neighbor frequency list for redirection is sent downlink in radio resource control signaling or the neighbor frequency list for redirection is sent downlink in system information.

3. The method according to claim 2, wherein the neighbor frequency list for redirection is in an information element sent downlink in at least one system information block or each different frequency in the neighbor frequency list for redirection is in a different information element sent downlink in at least one system information block.

4. The method according to claim 1, the method further comprising sending downlink at least one of:
at least a threshold of one or more criteria for including the measurement;
a time interval for including the measurement; and
an indication that the measurement is configured.

5. The method according to claim 4, wherein the at least threshold and/or the indication are sent downlink with the neighbor frequency list for redirection.

6. The method according to claim 1, wherein the neighbor frequency list for redirection for measurement comprises a neighbor frequency list for redirection for event-triggered measurement.

7. The method according to claim 6, the method further comprising sending downlink at least one of:
at least a threshold of one or more event criteria for triggering the event-triggered measurement;
a time interval for triggering the event-triggered measurement; and
an indication that the event-triggered measurement is configured.

8. An apparatus for controlling a network access node in a wireless communication system, the apparatus comprising at least one processor and at least one memory including computer program code, the at least one memory and the computer program code being configured to, with the at least one processor, cause the apparatus at least to:
send downlink a neighbor frequency list for redirection for measurement, the list comprising at least one neighbor frequency; and
in response to receiving from a user equipment during transition from an idle or semi-idle state an indication that its measurement of at least one of the neighbor frequencies in the list meets one or more reporting criteria, redirect the user equipment to establish a connection on a target frequency selected from the at least one of the neighbor frequencies,
wherein the indication comprises a one-bit flag for each of the neighbor frequencies in the list for which the user equipment is compatible, and each one-bit flag indicates whether the user equipment's measurement of the corresponding neighbor frequency meets the one or reporting criteria, and
the indication is contained in an information element which is received in a received radio resource control message, or
the indication is received in a RRC Connection Request message, and the redirecting comprises sending an indication of the target frequency in a RRC Connection Reject message.

9. A computer program product comprising a non-transitory computer-readable storage medium having computer readable instructions stored thereon, the computer readable instructions being executable by a computerized device to cause the computerized device to control a network access node in a wireless communication system to at least:
send downlink a neighbor frequency list for redirection for measurement, the list comprising at least one neighbor frequency; and
in response to receiving from a user equipment during transition from an idle or semi-idle state an indication that its measurement of at least one of the neighbor frequencies in the list meets one or more reporting criteria, redirect the user equipment to establish a connection on a target frequency selected from the at least one of the neighbor frequencies,
wherein the indication comprises a one-bit flag for each of the neighbor frequencies in the list for which the user equipment is compatible, and each one-bit flag indicates whether the user equipment's measurement of the corresponding neighbor frequency meets the one or reporting criteria, and
the indication is contained in an information element which is received in a received radio resource control message, or
the indication is received in a RRC Connection Request message, and the redirecting comprises sending an indication of the target frequency in a RRC Connection Reject message.

10. A method for controlling a user equipment in a wireless communication system, the method comprising:
for each neighbor frequency in a received neighbor frequency list for redirection whose received signal strength and/or quality meet one or more criteria, taking a measurement of the neighbor frequency while the user equipment is in transition from an idle or semi-idle state;
checking whether the measurement satisfies reporting criteria; and
sending to a serving network access node an indication of the neighbor frequency or frequencies whose measurement meets the reporting criteria, without reporting the measurement,
wherein the indication comprises a one-bit flag for each of the neighbor frequencies whose measurement exceeds the reporting criteria, and each one-bit flag indicates whether the user equipment's measurement of the corresponding neighbor frequency meets the reporting criteria, and
wherein the indication is contained in an information element which is sent in a radio resource control message, or
the indication is sent in a RRC Connection Request message, and the method further comprises, in response to receiving in a RRC Connection Reject message an indication of the target frequency which was indicated as having a measurement that meets the reporting criteria, attempting to establish a connection on the target frequency.

11. The method according to claim 10, wherein the neighbor frequency list for redirection is received in downlink radio resource control signaling or the neighbor frequency list for redirection is received in broadcast system information.

12. The method according to claim 11, wherein the neighbor frequency list for redirection is in an information element received in a system information block or each different frequency in the neighbor frequency list for redirection is received in a different information element of a system information block.

13. The method according to claim 10, wherein at least one of a threshold of the one or more criteria, a time interval of the one or more criteria, and an indication that the measurement is configured, is received in downlink signaling with the neighbor frequency list for redirection.

14. The method according to claim 10, wherein the one or more criteria comprise event-triggering criteria.

15. The method according to claim 14, wherein at least one of a threshold of the event-triggering, a time interval of the event-triggering, and an indication that the event-triggered measurement is configured, is received in downlink signaling with the neighbor frequency list for redirection.

16. An apparatus for controlling a user equipment in a wireless communication system, the apparatus comprising at least one processor and at least one memory including computer program code, the at least one memory and the computer program code being configured to, with the at least one processor, cause the apparatus at least to:

for each neighbor frequency in a received neighbor frequency list for redirection whose received signal strength and/or quality meet one or more criteria, take a measurement of the neighbor frequency while the user equipment is in transition from an idle or semi-idle state;

check whether the measurement satisfies reporting criteria; and send to a serving network access node an indication of the neighbor frequency or frequencies whose measurement meets the reporting criteria, without reporting the measurement, wherein the indication comprises a one-bit flag for each of the neighbor frequencies whose measurement exceeds the reporting criteria, and each one-bit flag indicates whether the user equipment's measurement of the corresponding neighbor frequency meets the reporting criteria, and wherein the indication is contained in an information element which is sent in a radio resource control message, or the indication is sent in a RRC Connection Request message, and the method further comprises, in response to receiving in a RRC Connection Reject message an indication of the target frequency which was indicated as having a measurement that meets the reporting criteria, attempting to establish a connection on the target frequency.

17. A computer program product comprising a non-transitory computer-readable storage medium having computer readable instructions stored thereon, the computer readable instructions being executable by a computerized device to cause the computerized device to control a user equipment in a wireless communication system to at least:

for each neighbor frequency in a received neighbor frequency list for redirection whose received signal strength and/or quality meet one or more criteria, take a measurement of the neighbor frequency while the user equipment is in transition from an idle or semi-idle state;

check whether the measurement satisfies reporting criteria; and send to a serving network access node an indication of the neighbor frequency or frequencies whose measurement meets the reporting criteria, without reporting the measurement, wherein the indication comprises a one-bit flag for each of the neighbor frequencies whose measurement exceeds the reporting criteria, and each one-bit flag indicates whether the user equipment's measurement of the corresponding neighbor frequency meets the reporting criteria, and wherein the indication is contained in an information element which is sent in a radio resource control message, or the indication is sent in a RRC Connection Request message, and the method further comprises, in response to receiving in a RRC Connection Reject message an indication of the target frequency which was indicated as having a measurement that meets the reporting criteria, attempting to establish a connection on the target frequency.

* * * * *